(12) United States Patent
Galluzzi et al.

(10) Patent No.: US 11,019,298 B2
(45) Date of Patent: May 25, 2021

(54) METHOD OF INTEGRATING CAMERAS IN VEHICLES, CORRESPONDING SYSTEM, CIRCUIT, KIT AND VEHICLE

(71) Applicant: STMicroelectronics S.r.l., Agrate Brianza (IT)

(72) Inventors: Alessandro Vittorio Galluzzi, San Giuliano Milanes (IT); Riccardo Parisi, Milan (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 0 days.

(21) Appl. No.: 16/179,550

(22) Filed: Nov. 2, 2018

(65) Prior Publication Data

US 2019/0141276 A1    May 9, 2019

(30) Foreign Application Priority Data

Nov. 7, 2017   (IT) .................. 102017000126492

(51) Int. Cl.
| | |
|---|---|
| *H04N 5/38* | (2006.01) |
| *B60R 1/00* | (2006.01) |
| *H04N 7/18* | (2006.01) |
| *H04W 4/40* | (2018.01) |
| *H04L 29/08* | (2006.01) |

(52) U.S. Cl.
CPC .............. *H04N 5/38* (2013.01); *B60R 1/00* (2013.01); *H04N 7/18* (2013.01); *B60R 2300/20* (2013.01); *B60R 2300/207* (2013.01); *B60R 2300/302* (2013.01); *B60R 2300/8033* (2013.01); *H04L 67/12* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 6,028,537 | A | 2/2000 | Suman et al. |
| 6,259,475 | B1 * | 7/2001 | Ramachandran .... B60Q 1/0023 348/117 |
| 9,718,405 | B1 | 8/2017 | Englander et al. |
| 2004/0049789 | A1 | 3/2004 | Bower et al. |
| 2009/0315992 | A1 | 12/2009 | Haug |

(Continued)

FOREIGN PATENT DOCUMENTS

| | | |
|---|---|---|
| CN | 204206332 U | 3/2015 |
| CN | 105898202 A | 8/2016 |

(Continued)

OTHER PUBLICATIONS

Techtime Electronics & Technology News, "i4drive and Japanese Rico to develop new ADAS," May 3, 2016, https://techtime.news/, 3 pages.

(Continued)

*Primary Examiner* — Rebecca A Volentine
(74) *Attorney, Agent, or Firm* — Slater Matsil, LLP

(57) ABSTRACT

The method includes providing a front view camera on a vehicle equipped with radio equipment. Video frames from the front view camera are supplied to video signal handling circuitry in a mobile communication device. The video frames from the front view camera are handled by the video signal handling circuitry under the control of the radio equipment.

18 Claims, 3 Drawing Sheets

(56) References Cited

U.S. PATENT DOCUMENTS

| | | |
|---|---|---|
| 2011/0169626 A1 | 7/2011 | Sun et al. |
| 2014/0111647 A1 | 4/2014 | Atsmon et al. |
| 2015/0100633 A1 | 4/2015 | Barrett et al. |
| 2015/0307048 A1* | 10/2015 | Santora .................. G08G 1/205 348/148 |
| 2016/0006922 A1* | 1/2016 | Boudreau .......... H04N 5/23206 348/207.1 |
| 2016/0031389 A1* | 2/2016 | Grimm ................. B60R 16/023 701/33.1 |
| 2016/0197783 A1 | 7/2016 | Hort et al. |
| 2016/0325680 A1* | 11/2016 | Curtis ....................... B60R 1/00 |
| 2016/0379422 A1 | 12/2016 | Kahn |
| 2017/0072850 A1* | 3/2017 | Curtis ............... B60W 50/0097 |
| 2017/0106750 A1* | 4/2017 | Tauchi ...................... B60R 1/00 |
| 2017/0339401 A1* | 11/2017 | Mishima ................ H04N 7/181 |
| 2018/0301095 A1* | 10/2018 | Runyan ................ G09G 3/3406 |

FOREIGN PATENT DOCUMENTS

| | | |
|---|---|---|
| CN | 106469477 A | 3/2017 |
| CN | 106671922 A | 5/2017 |
| CN | 209290279 U | 8/2019 |
| WO | 2007093471 A1 | 8/2007 |

OTHER PUBLICATIONS

Pearl Rearvision, "RearVision: A redefined Wireless Backup Camera System," http://pearlauto.com/, Jul. 25, 2017, 7 pages.

\* cited by examiner

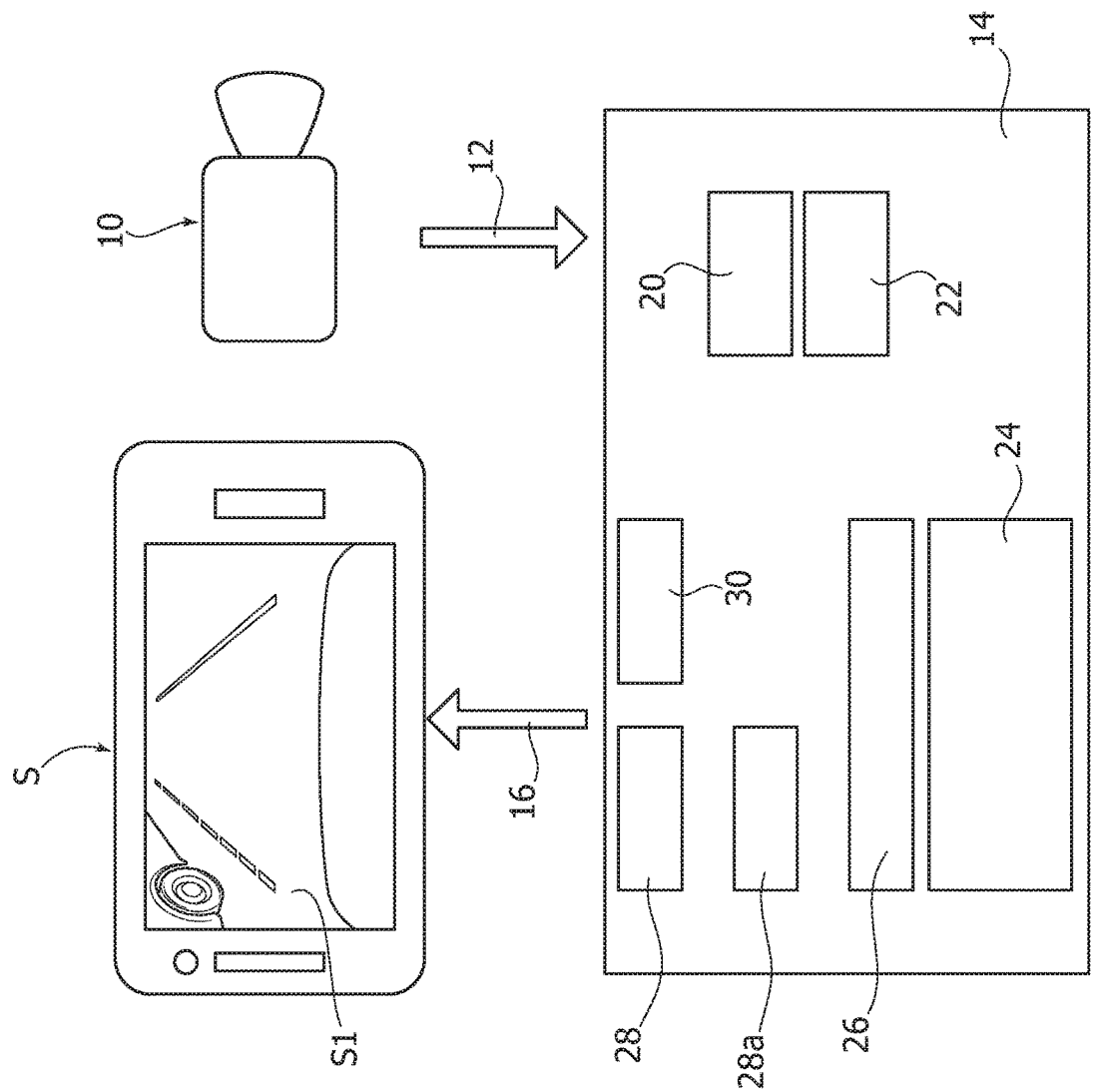

METHOD OF INTEGRATING CAMERAS IN VEHICLES, CORRESPONDING SYSTEM, CIRCUIT, KIT AND VEHICLE

CROSS-REFERENCE TO RELATED APPLICATIONS

This application claims priority to Italian Patent Application No. 102017000126492, filed on Nov. 7, 2017, which application is hereby incorporated herein by reference.

TECHNICAL FIELD

The description relates to the use of cameras in vehicles such as motor vehicles.

BACKGROUND

Cameras such as rearview (or "backup") cameras are currently installed in motor vehicles as an optional feature. Legislation is under way in certain countries intended to make a rearview camera to be compulsory equipment for all new cars for safety reasons.

A rearview camera allows a driver, when reversing, to see an image of the area just behind a car e.g. via a camera mounted on the car rear bumper. This facilitates avoiding e.g. inadvertent pedestrian backover crashes during reversing.

Different approaches can be adopted in integrating a rearview camera (and an associated monitor) in a motor vehicle.

For instance, a rearview camera and a monitor for displaying the images from the rearview camera can be included as original vehicle equipment (OEM) installed at the factory, possibly together with touchscreen navigation features and Bluetooth for hands-free phone calls. In certain cases, a monitor can be provided as a small monitor located in a rearview mirror on the driver's side.

A vehicle not provided with such original equipment can be "retro-fitted" with a rearview camera and an associated monitor. For instance, this may occur while replacing a factory-installed radio with a smarter radio, which may have associated e.g. a GPS viewing screen which may be exploited for displaying rearview camera images when the vehicle is in reverse.

Such upgrade will normally involve a relatively high cost, possibly justified (only) by additional benefits to rearview camera alone.

Another option may include a "kit" including a rearview camera for mounting e.g. at the car plate and an associated stand-alone monitor.

Solutions are available where a smart phone can be used to display rearview camera images, e.g. by sending the rearview camera images over a WiFi connections to a specific device that redirects the frame to the smart phone.

Italian Patent application 102017000088321 (not yet available to the public at the time of filing of the instant application) discloses a method (and corresponding system, circuit, kit and motor vehicle) wherein a rearview camera is provided on a vehicle equipped with a radio equipment, with video frames from the rearview camera received at the radio equipment and transmitted to a mobile communication device such as a smart phone equipped with a video screen so that video frames from the rearview camera are displayed on the video screen of the mobile communication device.

In certain countries (Russia being a case in point), such cameras are widely used, also with possible forensic relevance, e.g. as a measure against insurance fraud, of front cameras such as "dashboard" cameras, briefly "dash cams".

A dashboard camera (also referred to as car DVR or car black box) is an onboard camera that continuously records the view through the windscreen of a vehicle. It may be mounted e.g. in the passenger compartment, not necessarily on the dashboard: for instance it can be mounted on the inner surface of the windscreen by suction cup or adhesive-tape mount.

Front cameras such as dashboard cameras may provide video evidence in the event of a road accident. During parking, these cameras can still can capture video evidence if vandalism act is detected.

SUMMARY

In one embodiment of the present invention, the method includes providing a front view camera on a vehicle equipped with radio equipment; and supplying video frames from the front view camera to video signal handling circuitry in a mobile communication device. Video frames from the front view camera are handled by the video signal handling circuitry under the control of the radio equipment.

In an alternative embodiment of the present invention, a system includes a front view camera for mounting on a vehicle equipped with a radio equipment. The radio equipment includes a microprocessor and a memory storing instructions that when executed by the microprocessor are configured to sense an operational status of the vehicle and cause video frames from the front view camera to be supplied to video signal handling circuitry in a mobile communication device as a result of the operational status of the vehicle sensed at the radio equipment.

In an alternative embodiment of the present invention, a vehicle radio equipment circuitry includes a video signal receiver circuit configured to receive video signals conveying video frames from a vehicle front view camera. A video signal transmitter circuit is configured to transmit the video frames to a mobile communication device equipped with video signal handling circuitry that is configured to generate the video frames so as to be available for handling by the video signal handling circuitry of the mobile communication device.

In an alternative embodiment of the present invention, a kit includes a front view camera and a radio equipment for mounting on a vehicle. The radio equipment includes a video signal receiver circuit configured for receiving video signals conveying video frames from said front view camera mounted on said vehicle. The radio equipment further includes video signal transmitter circuit configured for transmitting the video frames to a mobile communication device equipped with video signal handling circuitry that is configured to generate the video frames so as to be available for handling by the video signal handling circuitry of the mobile communication device.

BRIEF DESCRIPTION OF THE DRAWINGS

One or more embodiments will now be described, by way of example only, with reference to the annexed figures, wherein:

FIG. 3 is a block diagram exemplary of a system architecture based on embodiments.

DETAILED DESCRIPTION OF ILLUSTRATIVE EMBODIMENTS

Figure 1:
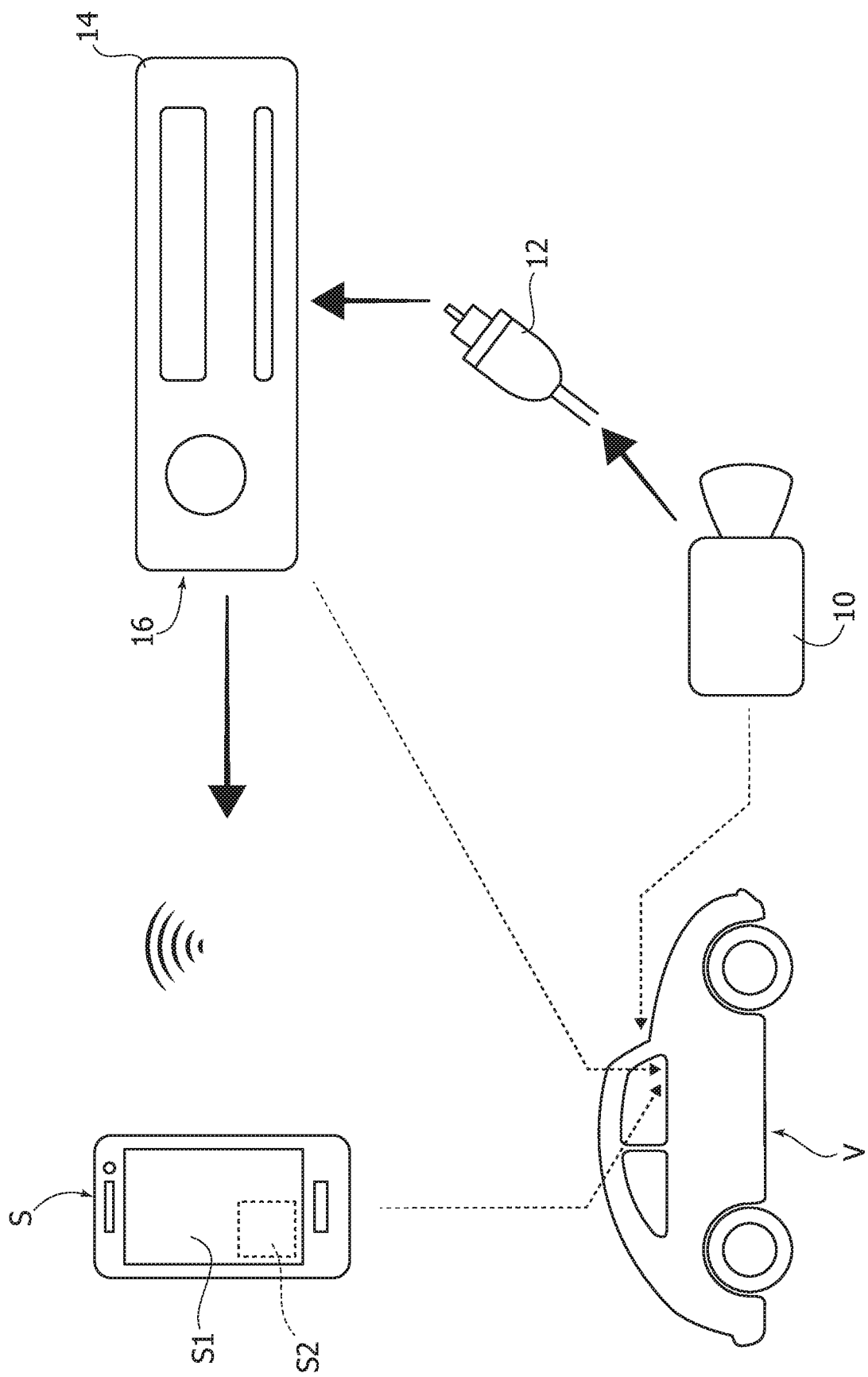
FIG. 1 is a functional diagram exemplary of embodiments.

One or more embodiments may apply to "after-market" or "retrofit" equipping of motor vehicles with cameras.

Despite the activity discussed in the foregoing, improvements are desirable in order to expand the use of cameras on board of vehicles, while addressing various issues possibly related to the use of cameras on board of vehicles.

For instance, reducing the cost of "retrofitting" an existing vehicle with e.g. a front view camera may facilitate the diffusion of such a safety feature.

The capability of interfacing with the "infotainment" system of the vehicle (e.g. the ability of exploiting data/messages from the CAN subsystem in the vehicle) may represent another desirable feature.

An accurate installation, not easy to be tampered with, possibly certified by a qualified operator, may represent a point of interest in view of the possible "forensic" relevance of front view camera images (e.g. for insurance purposes).

One or more embodiments may relate to a method, a system, a circuit as well as to a kit (e.g. for use in "retrofitting" existing vehicles) and a motor vehicle.

One or more embodiments make it possible to provide a vehicle with a front view camera feature at a reduced cost (e.g. a few USD).

One or more embodiments can be associated effectively with other "aftermarket" products by making these more appealing for the final user.

One or more embodiments make it possible to provide a vehicle with a front view camera feature with the camera representing practically the sole item to be added. The user should not install an extra device for recording purposes.

One or more embodiments may be based on the recognition that car radio systems such as 1DIN (ISO7736) car radio systems, which currently represent the majority of OEM and aftermarket systems, are not suitable to host dashcam camera use case because they do not have an LCD display or USB/BT/WiFi connectivity.

One or more embodiments may overcome that limitation by using the display screen of a driver's smart phone (or other mobile communication equipment) connected, e.g. via WiFi or USB, to the car radio system.

While apparently less significant (and notionally of no use) for a front view camera in comparison with a rearview camera (given the driver's direct view through the windscreen) such a feature may be of interest in certain cases, such as e.g. IR cameras, where the driver's mobile communication equipment may display an "enhanced" view of the scene captured by the camera.

More to the point, one or more embodiments may expand the use of cameras on board of vehicles beyond the mere possible display of video frames on a driver's mobile communication equipment, by taking advantage of the mobile communication circuitry (e.g. memory, transceiver) available in such a mobile communication equipment in order to store and/or transmit these video frames, possibly irrespective of the capability of displaying them on a mobile communication equipment.

For instance, such a user equipment can store (possibly after compression) the video frames in its memory (e.g. a nonvolatile memory—NVM) and/or send them over a mobile communication network, e.g. to a storage facility such as cloud storage, even without displaying them on its display screen.

By using the mobile equipment (e.g. a smartphone) as a gateway, various application cases of interest can be addressed.

For example a user data plan can be used to send a video stream to an insurance provider without an extra SIM card.

Also, information from the vehicle (as detected via the car radio system) can be used to trigger some specific event, e.g. for crash detection.

In FIG. 1 reference V indicates a vehicle such as a motor car having installed thereon (e.g. by way of retro-fitting) a front view ("dashboard") camera 10. The camera can be of any known type as already available on the market from various sources.

The camera 10 is coupled via a connection 12 to a car radio receiver 14 installed in the vehicle V and provided with a connection 16 (e.g. USB or WiFi, this latter designation being intended to be inclusive of Bluetooth connection) to a smart phone S or a similar mobile device (e.g. a tablet or the like) with video signal handling capability and comprising, in a manner known per se: a video quality screen S1, that is a screen (e.g. a LCD screen) capable of providing reproduction of video signals as produced by a front view camera such as 10; and mobile communication circuitry S2 capable of handling video signals, including at least one memory unit (e.g. nonvolatile-NVM) and a transmitter (transceiver), so that the circuitry S2 is capable of storing and transmitting these signals over a mobile communication network, while possibly applying to them some sort of elaboration e.g. rendering, encoding (e.g. in any compressed form).

Video signal handling capability as discussed above (including the capability for the circuitry S2 to co-ordinate display of video signals on the screen S1) is currently provided in a wide variety of mobile communication devices to permit e.g. taking photographs (e.g. "selfies") and videos (including sound) by using one or more cameras included in the mobile communication device and storing and/or transmitting them in various formats (e.g. various messaging formats, e-mail, WhatsApp®, social media and so on).

In one or more embodiments, a certain operational condition or status of the vehicle V (e.g. a brisk or abrupt deceleration, which may be indicative of a crash event, potential or actual) can be sensed (in a manner known per se) by the radio 14.

The video signals from the camera 10, as received by the radio 14 over the connection 12, can be sent towards the device S over the connection 16 to be possibly displayed on the screen S1 and, more to the point, to be handled by circuitry S2 e.g. by being stored—at least in a transitory manner—in the user equipment S and/or transmitted from the user equipment S over a mobile communication network to which the equipment is capable of connecting.

The user equipment may be configured (in a manner known per se) to be activated for that purpose as a result of that operational condition or status sensed, also in view of possible transmission (after optional processing, e.g. size reduction) over a mobile network.

This may permit making these video signals available (e.g. in cloud storage) for various possible uses, e.g. forensic use for insurance purposes.

The device S may be arranged on a support member (e.g. a support bracket in the passenger compartment) at an adequate location for access by the driver (e.g. within the driver's field of view of the device display screen and/or within driver reach to control transmission of the video signals from the device S).

In one or more embodiments such an arrangement may permit to avoid using a separate camera, with the function of the front view camera 10 provided by a camera as currently available in mobile communication devices such as the mobile device S, with the video frames from that camera supplied (directly) to the video signal handling circuitry S2 in the device S with handling of these frames by the video signal handling circuitry of the mobile communication device S taking place under the control of the radio equipment, e.g. with the radio equipment 14 sensing certain operational conditions of the vehicle V (e.g. a brisk or abrupt deceleration) and correspondingly actuating the video signal handling circuitry S2 of the mobile communication device. In various embodiments, the video signal handling circuitry S2 in the device S may be a microprocessor executing instructions stored in a non-volatile memory coupled to the microprocessor or alternately a dedicated circuit designed to perform some or all of the functions of the video signal handling circuitry S2.

In one or more embodiments the radio 14 can be e.g. a so-called 1DIN (ISO7736) radio not equipped with an LCD display.

As noted, such a car radio system (still representing a significant quota of OEM and aftermarket car radio systems) would per se be unable to support front view camera use and, more to the point, unable to support (smart) handling (storing and/or processing and/or transmitting) of video signals.

One or more embodiments make it possible to bypass these limitation by using a driver's smart phone (or similar mobile communication equipment) connected via WiFi or USB to the car radio 14 (which may be already equipped with such communication features for synchronization with such a smart phone e.g. for hands-free phone calls).

In one or more embodiments, the front view camera 10 can be installed at any known location for that purpose (e.g. on top of the vehicle dashboard, on the inner surface of the windscreen by suction cup or adhesive-tape mount, and so on) with the capability of sending video frames to the radio 14 over the connection 12. In one or more embodiments, an analog video decoder boa may be associated with the camera 10 for that purpose.

In one or more embodiments, the radio 14 can receive over the connection 12 video frames generated from the front view camera 10, e.g. using a Graphic accelerator or a video input port 140 (e.g. Accordo2 Smart Graphic Accelerator SGA, which is capable of "grabbing" frames in YUV format such as YUV422) and output them e.g. as RGB frames to be sent, possibly after optional compression (e.g. at a compressor 142 such as a Cortex R4-based compressor), to the device S (e.g. a smart phone) over the connection 16.

In one or more embodiments, a radio 14 such as e.g. a 1DIN radio can be (already) configured—in a manner known per se—to receive messages via a CAN subsystem or any other interface installed in the vehicle V and send to the device S corresponding messages, e.g. by using a dedicated protocol.

A Controller Area Network (CAN) bus is a known standard which enables communication between devices such as microcontrollers and other devices. While originally devised for other electrical wiring applications, it is extensively used in vehicles due e.g. to good noise immunity and the possibility of saving on copper. Also, being a message-based approach, a host computer is not required.

The radio 14 can be coupled to the vehicle infrastructure via a CAN subsystem and thus receive diagnostic messages coming from the vehicle. For instance, the status of the doors, the status of the lights, temperature, reverse activation, vehicle speed and other information items are sent via the CAN subsystem so that the radio 14 can receive them and react accordingly.

In one or more embodiments, the device S (hereinafter a smart phone will be mostly referred to for simplicity) can receive from the car radio 14 over the connection 16 video frames generated from the front view camera 10, and handle them e.g. as discussed previously, with the capability of optionally displaying them on the screen S1.

For instance, in one or more embodiments, a customer or third party application (possibly downloaded via the very device S) can render, encode (in any of a variety of e.g. compressed formats), store and/or transmit the frames.

In one or more embodiments, the device S can also decode messages coming from the radio 14 about the operation status (e.g. brisk or abrupt deceleration) as sensed—in manner known per se—at the radio 14.

It will be otherwise appreciated that the device S may per se be distinct from one or more embodiments.

The device S may simply be a mobile communications device ("user equipment") including a video-quality screen S1 and associated circuitry S2 (e.g. a smart phone, a tablet, a watch or any other type of portable/wearable device) as carried/worn by a driver and capable of being configured—in a manner known per se—for receiving from the radio 14 video frames generated from the front view camera 10 and displaying them on the screen S1.

Various (identical or different) options can be considered for both connections 12 and 16.

In one or more embodiments, the connection 12 of the camera 10 to the radio 14 may include a RCA connector (composite video)

In one or more embodiments, the connection 12 of the camera 10 to the radio 14 may be in compliance with the ITU-R BT 656 standard.

While not mandatory, in one or more embodiments, the connection 12 of the camera 10 to the radio 14 may include a wired connection. This may facilitate installation being entrusted to a qualified operator, also in view of possible certification. Also such a wired connection, included in the vehicle "harness", may be less exposed to undesired tampering.

In one or more embodiments, the connection 16 of the radio 14 to the device (smart phone) 10 may include a USB or WiFi (e.g. Bluetooth) connection.

While not mandatory, in one or more embodiments, such connection 16 may exploit a communication channel already provided (e.g. for hands-free phone calls).

In one or more embodiments a front view camera application ("app") can be loaded to the smart phone 10 to be triggered as a result of a certain condition or status (e.g. a brisk or abrupt deceleration or any of a set of events, possibly including user-selected and/or user-triggered events) is detected. This condition can be sensed by the radio 14 by being connected to the vehicle CAN subsystem.

Figure 2:
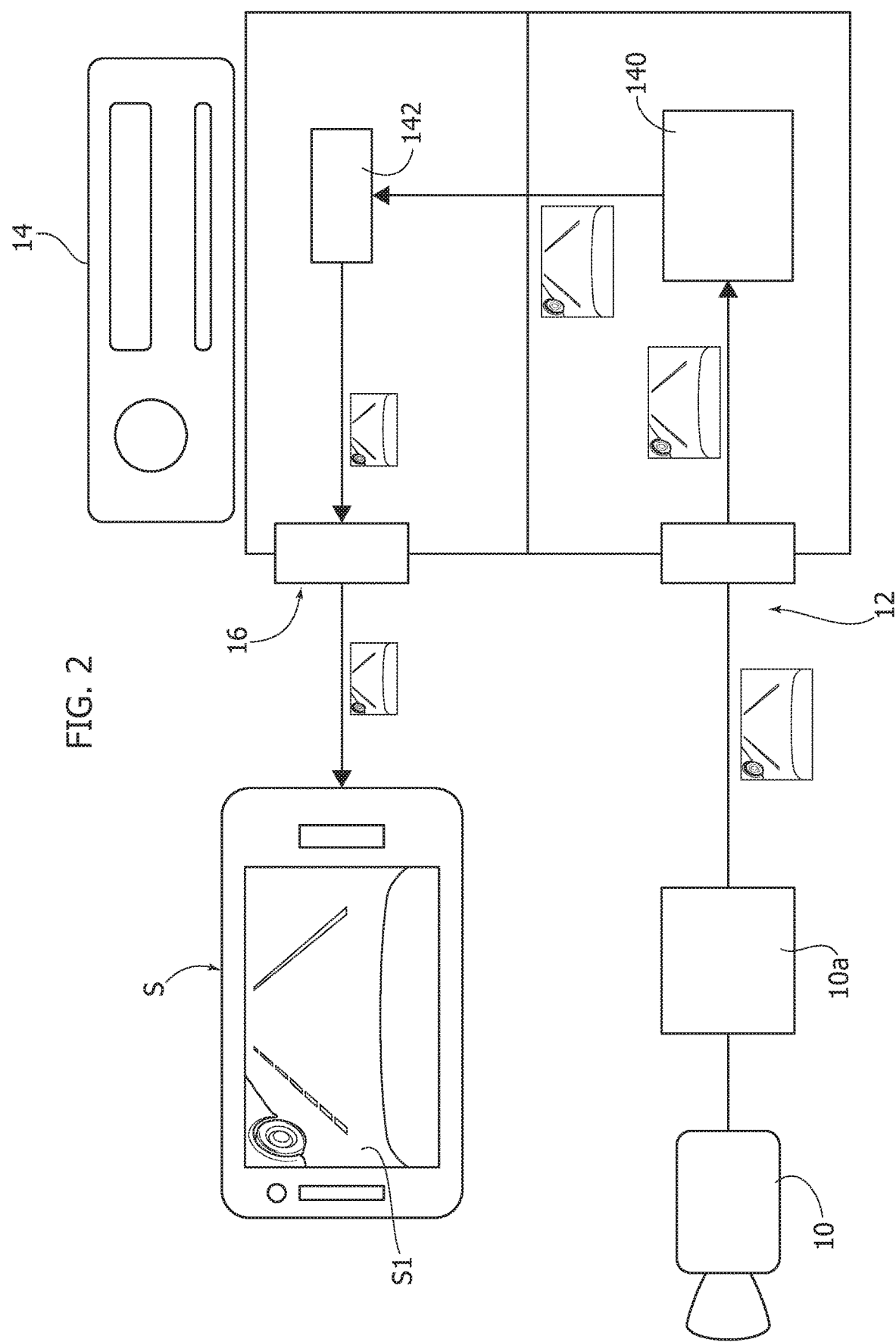
FIG. 2 is a block diagram exemplary of a system based on embodiments.

In one or more embodiments a circuit essentially corresponding to blocks 140 and 142 of FIG. 2 (including circuit elements providing interfacing with the connections 12 and 16) can be integrated into an otherwise conventional car radio 14, e.g. Accordo2™ as available with companies of the ST Group.

Accordo2™ is a family of devices that provide a cost effective microprocessor solution for modern automotive car radio systems, with an embedded powerful Digital Sound Processing subsystem, as well as a MIPS efficient ARM Cortex-R4 processor and an ARM Cortex-M3 controller dedicated for real-time CAN/Vehicle Interface Processing.

Accordo2™ family devices come with a set of common interfaces (UART/I2S/I2C/USB/MMC) which facilitates implementing a feature-rich system as well as a cost effective solution, bundled with a software package, which facilitates fast system implementation.

Accordo2™ family devices can manage an audio chain from analog or digital inputs to analog or digital outputs, including digital audio media decoding, sample rate conversion among various sources, intelligent routing and audio effects/DSP post processing. A flexible memory configuration facilitates implementing from very low cost systems based on real time OS, scaling up to demanding applications based on Linux OS.

Accordo2™ family devices are easily configurable in such a way that the vehicle being driven in reverse ("reversing") is detected to facilitate activation of the front view camera system described (only) during reversing.

The block diagram of FIG. 3 represents a possible software architecture of one or more embodiments adapted for implementation e.g. in Accordo2™ family devices.

Such architecture may provide a frame path from the camera 10 to the device (e.g. smart phone) S such that video frames from the camera 10 can be received at the radio 14 over the connection 12 e.g. via a video input port (VIP) driver 20 and processed (e.g. SGA) at 22.

A smartphone connectivity stack 24/USB stack 26 can be exploited to send the images from the camera 10 to the smart phone (or another screen-equipped device) S over the connection 16 (e.g. a USB connection).

Protocol features between the smart phone S and the radio 14 can include both EAP 28 (over iAp—28a)—for iOS devices—and AOA 30—for Android devices.

A method according to one or more embodiments may include providing a front view camera (e.g. 10) on a vehicle (e.g. a motor vehicle such as a motor car V) equipped with (e.g. car) radio equipment (e.g. 1DIN as exemplified at 14). The method may further include supplying (e.g. 16) video frames from the front view camera to video signal handling circuitry (e.g. S2) in a mobile communication device (e.g. a mobile communication device S carried or worn by the vehicle driver). Video frames from the front view camera are handled by the video signal handling circuitry under the control of the radio equipment.

In one or more embodiments, the radio equipment may sense at least one operational status of the vehicle and actuate the video signal handling circuitry of the mobile communication device as a result of the operational status of the vehicle sensed at the radio equipment.

One or more embodiments may include receiving (e.g. at 12) video frames from the front view camera at the radio equipment; and transmitting (e.g. at 16) video frames received at the radio equipment from the front view camera to the mobile communication device equipped with video signal handling circuitry.

In one or more embodiments, handling of video frames from the front view camera by the video signal handling circuitry of the mobile communication device may include at least one of: storing in the mobile communication device video frames from the front view camera; and/or transmitting from the mobile communication device video frames from the front view camera.

That is, the video frames from the front view camera may be stored in the mobile communication device acting as a recorder (or a sort of data logger) without being transmitted therefrom. Alternatively or in addition, the video frames may be transmitted from the mobile communication device (e.g. via a mobile communication network) without being stored therein, or by being stored therein in a transitory way to facilitate transmission; and/or both stored in the mobile communication device and transmitted therefrom.

In one or more embodiments, handling of video frames from the front view camera by the video signal handling circuitry of the mobile communication device may include displaying (e.g. as coordinated by the video signal handling circuitry) on a video screen (e.g. S1) of the mobile communication device video frames from the front view camera.

That is, in certain embodiments, the video signal handling circuitry of the mobile communication device may be exploited for storing and/or transmitting the video frames from the front view camera without necessarily displaying them (as this may not be required) or by having them displayed selectively, e.g. as a result of input from the driver/user (e.g. to benefit from enhanced IR vision).

In one or more embodiments, a system may include: a front view camera for mounting on a vehicle equipped with a radio equipment. The radio equipment configured for at least one of sensing at least one operational status of the vehicle and causing video frames from the front view camera to be supplied to video signal handling circuitry in a mobile communication device as a result of said at least one operational status of the vehicle sensed at the radio equipment; and/or receiving at the radio equipment video frames from the front view camera and transmitting video frames received at the radio equipment from the front view camera to video signal handling circuitry in a mobile communication device.

One or more embodiments may include a wired connection (e.g. 12) between the front view camera and the radio equipment.

In one or more embodiments, the radio equipment may include a WiFi or USB transmitter configured for transmitting to a mobile communication device video frame received from the front view camera.

In one or more embodiments, a circuit for inclusion in vehicle radio equipment may include a video signal receiver circuit block (e.g. 140) configured for receiving video signals conveying video frames from a vehicle front view camera. The video signal transmitter circuit block (e.g. 142) is configured for transmitting video frames received at the radio equipment from the front view camera to a mobile communication device equipped with video signal handling circuitry thereby making video frames from the front view camera available for handling by the video signal handling circuitry of the mobile communication device.

In one or more embodiments, the circuit may be configured for sensing at least one operational status of the vehicle and actuating the video signal handling circuitry of the mobile communication device as a result of said at least one operational status of the vehicle sensed at the radio equipment.

In one or more embodiments a kit may include a front view camera as well as radio equipment for mounting on a vehicle, the radio equipment including a video signal receiver circuit block configured for receiving video signals conveying video frames from said front view camera mounted on said vehicle. A video signal transmitter circuit block is configured for transmitting video frames received at the radio equipment from the front view camera to a mobile communication device equipped with video signal handling circuitry, thereby making video frames from the front view camera available for handling by the video signal handling circuitry of the mobile communication device.

One or more embodiments may include a vehicle (e.g. a motor car) equipped (as OEM feature or by way of retro-fitting) with a system according to one or more embodiments.

Without prejudice to the underlying principles, the details and embodiments may vary, even significantly, with respect to what has been described by way of example only, without departing from the extent of protection.

What is claimed is:

1. A method comprising:
having a vehicle without any front view camera attached thereon, the vehicle being equipped with radio equipment, the radio equipment being without a LCD display for displaying an output from the front view camera;
installing an after market front view camera on a dashboard or windscreen of the vehicle;
providing a wired connection between the front view camera and the radio equipment, the wired connection from the front view camera installed on the dashboard or the windscreen being disposed within a harness of the vehicle and being configured to prevent tampering;
receiving diagnostic messages at the radio equipment from a Controller Area Network (CAN) subsystem of the vehicle;
at a video input port driver in the radio equipment, receiving video frames from the front view camera in a first format;
at a graphic accelerator in the radio equipment, grabbing the video frames in the first format and converting the video frames to a second format different from the first format; and
using a smartphone connectivity stack in the radio equipment, supplying the diagnostic messages and video frames from the front view camera to video signal handling circuitry in a mobile communication device, wherein the video frames from the front view camera are encoded and rendered by the video signal handling circuitry under the control of the radio equipment.

2. The method of claim 1, further comprising:
sensing an operational status of the vehicle at the radio equipment; and
actuating the video signal handling circuitry of the mobile communication device as a result of the sensed operational status of the vehicle.

3. The method of claim 2, further comprising:
transmitting the video frames received at the radio equipment from the front view camera to the mobile communication device equipped with video signal handling circuitry, wherein the wired connection is compliant with ITU-R BT 656 standard.

4. The method of claim 1, further comprising:
transmitting the video frames received at the radio equipment from the front view camera to the mobile communication device equipped with video signal handling circuitry, wherein the wired connection is compliant with ITU-R BT 656 standard.

5. The method of claim 1, further comprising displaying the video frames by the video signal handling circuitry of the mobile communication device.

6. The method of claim 5, further comprising:
storing the video frames from the front view camera in the mobile communication device.

7. The method of claim 5, further comprising:
transmitting the video frames from the mobile communication device.

8. The method of claim 5, further comprising activating the camera when the vehicle is reversing.

9. A system comprising:
a front view camera installed on a dashboard or windscreen of a vehicle equipped with a radio equipment, the radio equipment being without a LCD display for displaying an output from the front view camera;
a wired connection between the front view camera and the radio equipment disposed within a harness of the vehicle and being configured to prevent tampering;
the radio equipment configured to receive diagnostic messages from a Controller Area Network (CAN) subsystem of the vehicle; and
the radio equipment comprising a microprocessor and storing instructions in a memory, the instructions when executed by the microprocessor are configured to
at a video input port driver in the radio equipment, receive video frames from the front view camera in a first format,
at a graphic accelerator in the radio equipment, grabbing the video frames in the first format and converting the video frames to a second format different from the first format,
using a smartphone connectivity stack in the radio equipment, determine an operational status of the vehicle based on the diagnostic messages; and
cause video frames from the front view camera to be transmitted to video signal handling circuitry in a mobile communication device when the operational status of the vehicle is indicative of a predetermined condition, wherein the video frames from the front view camera are configured to be encoded and rendered by the video signal handling circuitry under the control of the radio equipment.

10. A vehicle equipped with the system according to claim 9.

11. The system of claim 9, further comprising a transmitter configured to:
transmit the video frames to the video signal handling circuitry in the mobile communication device.

12. The system of claim 9, wherein the wired connection is compliant with ITU-R BT 656 standard.

13. The system of claim 12, wherein the radio equipment includes a USB transmitter configured for transmitting the video frame received from the front view camera to the mobile communication device.

14. A vehicle equipped with the system according to claim 13.

15. The system of claim 9, wherein the radio equipment includes a WiFi or USB transmitter configured for transmitting the video frame received from the front view camera to the mobile communication device.

16. A vehicle radio equipment comprising:
a video input port driver configured to receive video signals conveying video frames from a vehicle front view camera in a first format, the vehicle radio equipment being without a LCD display for displaying an output from the vehicle front view camera, wherein the vehicle radio equipment is configured to receive diagnostic messages from a Controller Area Network (CAN) subsystem of the vehicle;
a graphic accelerator configured to grab the video frames in the first format and convert the video frames to a second format different from the first format,
a smartphone connectivity stack configured to supply the diagnostic messages and the video frames in the second format to video signal handling circuitry in a mobile communication device, wherein the video frames from the front view camera are configured to be encoded and rendered by the video signal handling circuitry under the control of the radio equipment; and a memory storing instructions for sensing an operational status of the vehicle, wherein the video signal handling circuitry of the mobile communication device is configured to be actuated based on the operational status of the vehicle sensed at the radio equipment, and wherein the operational status comprises sensing an indication of a crash event.

17. A kit comprising:

a front view camera; and a radio equipment for mounting on a vehicle, wherein the vehicle radio equipment is configured to receive diagnostic messages from a Controller Area Network (CAN) subsystem of the vehicle, the radio equipment comprising:

a video input port driver configured for receiving video signals conveying video frames in a first format from the front view camera mounted on the vehicle; and a graphic accelerator configured to grab the video frames in the first format and convert the video frames to a second format different from the first format, and a smartphone connectivity stack configured to supply the diagnostic messages and the video frames in the second format to video signal handling circuitry in a mobile communication device, wherein the video frames from the front view camera are configured to be encoded and rendered by the video signal handling circuitry under the control of the radio equipment; and a memory storing instructions for sensing an operational status of the vehicle, wherein the video signal handling circuitry of the mobile communication device is configured to be actuated based on the operational status of the vehicle sensed at the radio equipment, and wherein the operational status comprises sensing an indication of a crash event.

18. The kit of claim 17, wherein the radio equipment includes a WiFi or USB transmitter configured for transmitting the video frame received from the front view camera to the mobile communication device.

* * * * *